United States Patent [19]

Heinzl et al.

[11] 4,266,250
[45] May 5, 1981

[54] ARRANGEMENT FOR THE OPTOELECTRICAL SCANNING OF A MASTER

[75] Inventors: Joachim Heinzl, Munich; Erich Kattner, Neubiberg, both of Fed. Rep. of Germany

[73] Assignee: Siemens Aktiengesellschaft, Berlin & Munich

[21] Appl. No.: 944,156

[22] Filed: Sep. 20, 1978

[30] Foreign Application Priority Data

Oct. 27, 1977 [DE] Fed. Rep. of Germany ....... 2748266

[51] Int. Cl.³ .............................................. H04N 1/06
[52] U.S. Cl. .................................... 358/285; 358/293
[58] Field of Search ............... 358/285, 286, 293, 294, 358/295, 258, 901, 212; 340/146.3 MA, 146.3 F

[56] References Cited

U.S. PATENT DOCUMENTS

| | | | |
|---|---|---|---|
| 1,751,584 | 3/1930 | Hansell | 358/901 |
| 3,271,576 | 9/1966 | Turner | 340/146.3 MA |
| 3,417,372 | 12/1968 | Bieser | 340/146.3 MA |
| 3,538,499 | 11/1970 | Rabinow | 358/285 |
| 3,591,721 | 7/1971 | Salam | 340/146.3 F |
| 3,706,842 | 12/1972 | Robertson | 358/258 |
| 3,739,095 | 6/1973 | Alden | 358/285 |
| 3,993,865 | 11/1976 | Brown | 358/285 |
| 4,148,076 | 4/1979 | Costello | 358/285 |

FOREIGN PATENT DOCUMENTS 2518370 4/1976 Fed. Rep. of Germany .

OTHER PUBLICATIONS

Schreibstation PT 80, Peukert and Senger Siemens-Zeitschrift, pp. 215-218.
Portable Printing and Plotting-Electronics, Mar. 3, 1977.

*Primary Examiner*—Robert L. Griffin
*Assistant Examiner*—Michael Allen Masinick
*Attorney, Agent, or Firm*—Hill, Van Santen, Steadman, Chiara & Simpson

[57] ABSTRACT

An arrangement for optoelectrically scanning a master employs a scanning device having a plurality of scanning elements which simultaneously scan a plurality of parallel lines of a row, the master being displaced at right angles to the scanning direction. The scanning device, like a mosaic printing head, is disposed on a printing carriage of a printing station which moves along a platen and the master to be scanned can be placed around the platen which displaces the master as scanning takes place. In one embodiment the scanning device includes scanning elements which are disposed like the printing elements of a mosaic printing head and the scanned points communicate with the scanning elements through light tunnels, which tunnels may include light guides. In another embodiment, the scanning device includes a lens which focuses the scan points on the scanning elements.

4 Claims, 2 Drawing Figures

ARRANGEMENT FOR THE OPTOELECTRICAL SCANNING OF A MASTER

BACKGROUND OF THE INVENTION

1. Field of the Invention

This invention relates to an arrangement for the optoelectrical scanning of a master, where a scanning device which has a plurality of scanning elements simultaneously scans a plurality of parallel lines of a row, and where the master is moved at right angles to the direction of scanning.

2. DESCRIPTION OF THE PRIOR ART

With known facsimile machines, which are also known as remote copiers, a master to be scanned is clamped on a revolving roll and the master is scanned line-by-line with a scanning element, for example a photoconductive cell or a phototransistor. Scanning signals produced by this scanning elements are transmitted to a receiving unit where, line-by-line, point-by-point, the scanned master is reproduced. With mechanical printing systems, approximately six minutes are required to reproduce a din A4 page and with electrographic processes about two to three minutes are required.

The German published application No. 25 18 370 discloses a scanning device in which a plurality of lines are scanned simultaneously in order to reduce the time needed for scanning the master. The master to be scanned is moved in steps at right angles to the direction of scanning in a flat-bed scanner. The scanning device has a plurality of scanning elements, photodiodes for example, and the scanning device is moved backwards and forwards over the master. While the scanning device reverses its direction of movement after completing scanning in one direction, the master is displaced by one forward feed step at right angles to the direction of scanning. Due to the plurality of scanning elements, the master is scanned simultaneously along a multiplicity of parallel lines. The number of lines is the same as the number of scanning elements.

In a publication of B. Peukert and H. Senger: Schreibstation PT80, Siemens Journal 51 (1977), Vol. 4, p 215–218, a printing station is described which can be employed instead of remote or data printing machines. The printing station has a mosaic printing head which presents the characters to be printed in a grid of 12×9 matrix points. The mosaic printing head can also take the form of a needle printing head, containing 12 printing needles driven by means of plunger moving coils which are staggered in two rows for two groups of six needles.

The mosaic printing head, however, can also take the form of an ink printing head having 12 jets controlled by piezoceramic means.

If, when using a printing station of this kind, graphic specimens are also to be reproduced, in addition to alpha-numeric characters and special characters, and the printing station is therefore also to be used as a facsimile receiver at the same time, then it is advantageous to have a scanning device with which a master to be transmitted can be scanned.

SUMMARY OF THE INVENTION

The object of the present invention, therefore, is to provide a scanning device for the optoelectrical scanning of a master, which device requires little expenditure and which can be used, in particular, to advantage when a printing station having a mosaic printing head is provided as a facsimile unit.

According to the present invention, the foregoing object is achieved by an arrangement of the general type described above in that the scanning device is arranged on a printing carriage of a printing station like a mosaic printing head, moving along a platen, and in that the master to be scanned can be placed around the platen which moves the master in line with the scanning operation.

An arrangement constructed in accordance with the present invention has the advantage that a printing station can be used quite simply both for scanning a master for facsimile transmission purposes and for reproducing the content of a scanned master and for reproducing alpha-numeric characters and special characters. In order to scan the master, therefore, no internal scanning unit is necessary and the printing station can be used, in turn, as a facsimile transmitter, facsimile receiver and as a remote or data printing machine.

Production of the scanning device is particularly inexpensive if the scanning elements are arranged like the printing elements of a mosaic printing head and communication between the scanned points and the scanning elements is effected by means of light tunnels. For example, the scanning elements are used instead of the plunger moving coils in a needle printing head, or instead of piezoceramics in an ink printing head.

Since the guides for the printing needles in a printing head are frequently curved, it is favorable if light guides are provided in the light tunnels.

The light tunnels, and where applicable the light guides, are unnecessary if the scanning device has a lens which focuses the scanned points on the scanning elements. In this case, it is of particular advantage if the scanning elements are constituted by photoelements that are components of an integrated circuit. The photoelements may be photoconductive cells, photodiodes or phototransistors for example.

A printing station may be used, in turn, as a facsimile transmitter or a facsimile receiver and a remote or data printing machine, if the scanning device can also be attached to the mosaic printing head on the printing carriage. It is of particular advantage if the scanning device forms an integral unit with the mosaic printing head.

Scanning of a master is effected in a particularly short period of time if the scanning device scans the master during movement in both directions along the platen. In this case, the time for scanning or reproducing a DIN A4 page can be reduced to 30 seconds.

BRIEF DESCRIPTION OF THE DRAWINGS

Other objects, features and advantages of the invention, its organizations, construction and operation will be best understood from the following detailed description, taken in conjunction with the accompanying drawing, on which.

DESCRIPTION OF THE PREFERRED EMBODIMENTS

Figure 1:
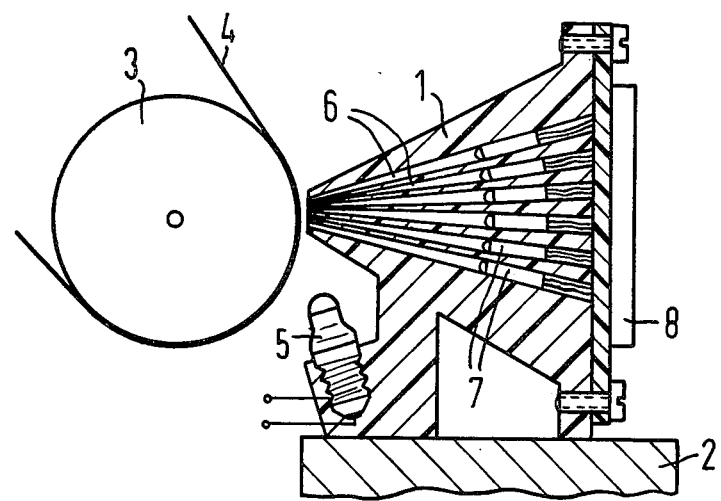
FIG. 1 is a sectional view of an arrangement constructed in accordance with the present invention, and in which the scanning device has light tunnels.

Referring first to the arrangement illustrated in FIG. 1, a scanning device 1 is arranged on a printing carriage 2 of a printing station. The printing carriage 2 moves along a platen 3 around which a master 4 to be scanned is placed.

Similarly to when printing characters by means of a mosaic printing head in the printing station, the printing carriage 2 always moves while scanning the master 4 from the left hand edge of the master to its right hand side, then reverses its direction of movement and returns to the left hand edge. After a further reversal of the direction of movement, the printing carriage 2 returns to the right hand edge and so on. At the latest, on the occasion of the reversal in direction at the left hand edge, the platen 3 moves the master 4 by one forward feed step, and if scanning is also effected during the movement of the printing carriage 2 from the right hand edge to the left hand edge, the platen 2 also moves the master 4 by one forward feed step on the occasion of the change in direction of movement at the right hand edge. It is also possible to effect scanning of the master with continuous movement of the platen 3. A light source 5 illuminates the master 4 and the light reflected by the master 4 passes via light tunnels 6 to a plurality of photoelements 7. The photoelements may be photoconductive cells, photodiodes or phototransistors for example. According to the incident light, the photoelements 7 change in conductivity and emit corresponding signals to a threshold value amplifier which is accommodated in a housing 8. The scanning device 1 is built similar to a mosaic printing head where the printing elements are replaced by the photoelements. A mosaic printing head designed as an ink printing head is described, for example, in the German published application 25 43 451. The body of this ink printing head consists of a workpiece made from plastic using an injection moulding process, containing a plurality of ducts which carry the ink. The ducts are fitted flush without kinks inside the body, radiating out from the printing point. They form two planes inclined at an acute angle to each other. Printing elements constituted by piezoceramic elements are fitted at thick points in the ducts. Instead of these printing elements, photoelements 7 are provided in the scanning device 1 and the ducts correspond to the light tunnels 6. Since the structure of the scanning device 1 and the known printing head are generally similar, the same body can be used both for the scanning device 1 and for the ink printing head for example.

With a needle printing head, in which twelve printing needles are provided, driven by means of plunger moving coils, the printing needles are mostly guided in a fan-shape pattern to the plunger moving coils which are mostly disposed in a circular arrangement. If the body of such a needle printing head is to be used as a scanning device 1 and the photoelements 7 are fitted instead of the plunger moving coils, it would then be advantageous to employ light guides in the light tunnel 6 because of the curved light tunnels.

If 12 scanning units are provided, for example, in the scanning device 1, then 12 lines of a row are scanned at the same time. If a printing station is provided as a facsimile receiver, containing a mosaic printing head having 12 printing elements, then the 12 scanning signals emitted by the scanning device, where necessary after storage and conversion, are transmitted to the 12 printing elements and are converted into print according to the brightness of the scanned point concerned. In this manner, using a known needle printing head, a DIN A4 page, for example, can be scanned and printed in 2 minutes. Using an ink printing head, which prints both during the forward and the return movements of the printing carriage, the scanning and printing time for a DIN A4 page can be reduced to 30 seconds.

Each time the printing carriage 2 changes direction at the right or left hand edge, the master 4 is displaced one forward feed step by the platen 3. The forward feed step is the same size as a row, which consists of 12 lines, so that the master 4 is scanned without any gaps. If, when printing characters, the printing station presents the characters in a grid of $12 \times 9$ matrix points and if, in each case, 12 matrix points represent the height of a row of print, then the master 4 is displaced during the scanning by the height of this row of print.

Figure 2:
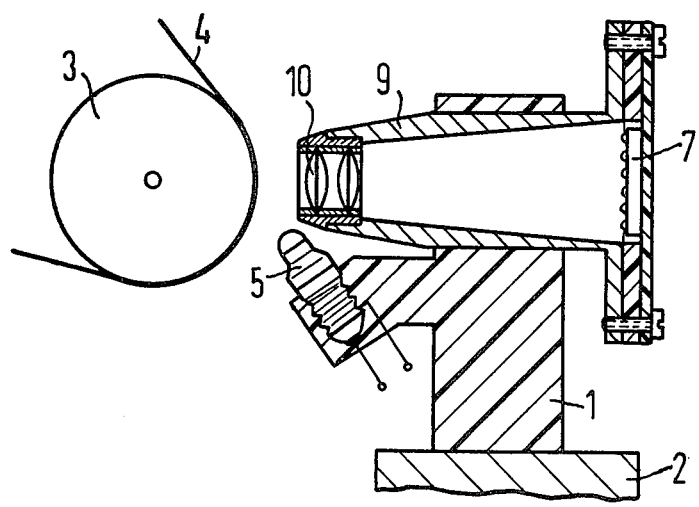
FIG. 2 is a sectional view of an arrangement constructed in accordance with the present invention, and in which the scanning device is fitted with a lens.

Referring now to the arrangement illustrated in FIG. 2, the scanning device 9 is also fitted on a printing carriage 2. On the side facing the master the scanning device 9 has a lens 10 which focuses the scanned point on the master 4 on the photoelements 7. The photoelements 7 may be arranged, for example, in two rows each of six photoelements and the scanning grid corresponds to the arrangement of the printing needles of the printing needle head or the jet arrangement in the case of the ink printing head. With the aid of the lens 10, the result is that a light source 5 with a lesser light intensity may be used. The photoelements 7 may be components of an integrated circuit, for example, which may also contain the threshold value amplifier. The moement of the scanning device 9 corresponds to that of the scanning device 1 so that again by using this scanning device 9 the master 4 is scanned continuously without any gaps.

If phototransistors are used as the photoelements 7, the phototransistors should be set so that they connect through completely when scanning a blank zone and are blocked off when scanning a black zone. The threshold value switch connected after each phototransistor has a degree of hysteresis and may be set, for example, so that a grey area is still detected with a preset degree of reflection so that in the printing station operating as a facsimile receiver the corresponding printing element still prints.

If the reproduction of grey values is required, then an analog amplifier is provided instead of the threshold value switch. The amplitude of the signal emitted at the analog amplifier output is then a measure of the density at the time of reproduction in the receiving printing station.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably be included within the scope of our contribution to the art.

We claim:

1. In an arrangement for optoelectrical scanning of a plurality of parallel lines of a row on a master which is carried, at a printing station, by a platen which moves the master in a first direction, and in which a printing carriage is provided to move perpendicularly to the direction of movement of and transversely across the master, the improvement therein comprising:

a scanning device mounted on said carriage for movement therewith and including a scanning head and plurality of scanning elements mounted in said scanning head at positions similar to that of printing elements of a mosaic printing head; and said scanning head including a plurality of light tunnels which direct light from the scanned points of the master to said scanning elements.

2. The improved arrangement of claim 1, wherein: light conductors are disposed in said light tunnels.

3. The improved arrangement of claim 1, comprising: a mosaic printing head also mounted on said printing carriage.

4. The improved arrangement of claim 3, wherein said scanning device and said mosaic printing head are integrated as a single unit.

* * * * *